United States Patent
Chen et al.

(10) Patent No.: US 6,417,481 B2
(45) Date of Patent: Jul. 9, 2002

(54) METHOD AND A DEVICE FOR HEATING AT LEAST TWO ELEMENTS BY MEANS OF LASER BEAMS OF HIGH ENERGY DENSITY

(75) Inventors: Jie-Wei Chen, Alpnach Dorf; Christiane Leister, Stalden, both of (CH)

(73) Assignee: LEISTER Process Technologies (CH)

(*) Notice: Subject to any disclaimer, the term of this patent is extended or adjusted under 35 U.S.C. 154(b) by 59 days.

(21) Appl. No.: 09/746,285

(22) Filed: Dec. 22, 2000

(30) Foreign Application Priority Data

Dec. 23, 1999 (EP) .............................. 99125782

(51) Int. Cl.[7] .............................. B23K 26/06
(52) U.S. Cl. .............................. 219/121.6; 219/121.64; 219/121.69
(58) Field of Search .............................. 219/121.6, 121.61, 219/121.63, 121.64–121.65, 121.66, 121.67, 121.68, 121.69–121.78, 121.79; 156/272.8

(56) References Cited

U.S. PATENT DOCUMENTS

| | | | | |
|---|---|---|---|---|
| 4,335,362 A | * | 6/1982 | Salathe et al. | 148/DIG. 140 |
| 5,676,866 A | * | 10/1997 | in den Baumen et al. | 219/121.74 |
| 5,793,461 A | * | 8/1998 | Inou | 349/153 |
| 6,031,201 A | * | 2/2000 | Amako et al. | 219/121.68 |
| 6,064,034 A | * | 5/2000 | Rieck | 219/121.84 |

FOREIGN PATENT DOCUMENTS

| | | |
|---|---|---|
| EP | 0 835 715 | 4/1998 |
| EP | 0 836 905 | 4/1998 |
| WO | WO95/16570 | 6/1995 |

\* cited by examiner

*Primary Examiner*—M. Alexandra Elve
*Assistant Examiner*—Jonathan Johnson
(74) *Attorney, Agent, or Firm*—Bachman & LaPointe, P.C.

(57) ABSTRACT

A process and a device for joining or separating various workpieces, in particular made of plastic or plastic and other materials, by means of curtain-like laser beams. To join workpieces in a particular joining area of the contact surface, a mask, made of a laser-impermeable material, is arranged between the laser source and the workpieces to be joined. The laser beam and the mask are moved relative to each other. To generate high energy density in the joining area, laser beams of at least two diode lasers are brought together, and subsequently, differing laser line lengths are generated by means of a zoom optics arrangement. Via a beam splitter, a first laser beam aligned perpendicularly to the surface of the mask, is joined by at least one secondary laser beam arranged perpendicularly to the first laser beam, and the resulting laser beam is directed onto the mask.

8 Claims, 2 Drawing Sheets

METHOD AND A DEVICE FOR HEATING AT LEAST TWO ELEMENTS BY MEANS OF LASER BEAMS OF HIGH ENERGY DENSITY

BACKGROUND OF THE INVENTION

The present invention concerns a method for heating at least two elements by means of laser beams, so as to either join or separate the elements.

The present invention relates in particular to a laser joining method for joining various workpieces made of plastic or plastic and other materials, with the upper workpiece facing the laser source comprising a material which is transparent to the laser beam, and the second workpiece comprising a material which is absorbent to the laser beam, so that the adjoining contact surfaces of the two workpieces melt and connect to each other during subsequent cooling under pressure; with a mask being arranged between the laser source and the workpieces to be connected so as to connect the workpieces in a particular joining area of the contact surface, with the structures of said mask being larger than the wavelength of the laser beam applied, with the laser source being set to the contact surface in such a way that a curtain-like laser beam is formed and that a line results at the contact surface, and that the laser beam and the mask are moved relative to each other. The invention also relates to a device for carrying out the method.

This method is described in the pending European patent application 99101816.9. This method of joining masks for microstructured components requires very high movement speeds of the laser beam and the components to be joined. In order to achieve the necessary melt temperature, a very high energy density of the laser irradiation is also required. However, currently available laser diode series of semiconductor lasers only achieve an output of max. 60–80 W. Yet there are diode stacks whose output is in the kW range, whose laser beam can also be brought to form a line, by means of a suitable optical arrangement. Advantageously the laser beam is directed so as to be perpendicular to the joining area of the contact surface in order to achieve as exact a projection as possible, in particular in the case of small structures, and to preclude any unnecessary shadow effects. Because of the design of such lasers in the form of diode stacks, the laser beam impinges on the mask at an angle. Due to the resulting inaccuracies, such an angle is not acceptable for the mask joining method.

To place or remove, for example surface mount device (SMD) semiconductor components onto a carrier, European patent application 99121031.1, which is also pending, describes a method for heating such components by means of laser beams with the wiring paths on or in a printed circuit board. The connection can take place by means of a solder or solely by respective heating of the parts to be joined without the use of solder (so-called microjoining). According to the method, a mask of material which is impermeable to laser beams is arranged between the laser source and the components, with the areas to be joined having been removed on said mask. All heating regions are then irradiated individually or simultaneously by means of one or several laser beams, so that the heating regions of the components are heated and joined or separated. Inter alia a line-shaped laser beam can be selected which moves in relation to the components and the carrier. While with this method, heating of the components usually takes place more slowly than with the above-mentioned laser joining method, the provision of the required energy density can also pose a problem.

It is thus the object of the present invention to propose an option for providing adequate energy density in order to achieve adequate heating for the purpose of joining or separating at least two elements made from the same or from different materials, including metals, alloys, plastics, ceramics, and organic or inorganic substances. In particular it is the object of the invention to provide a high-quality area joint in the region of the joining zone of objects adjoining in a plane, with at least one object being made of plastic, and with the joining zone being well defined.

SUMMARY OF THE INVENTION

According to the invention this object is met by the method of the present invention. Further advantageous embodiments of the method are described herein. Furthermore, this object is met by a device of the present invention. Further advantageous embodiments of the device are provided herein.

Accordingly, to generate high energy density in the joining area, laser beams of at least two diode lasers are brought together, and that subsequently, differing laser line lengths are generated by means of a zoom optics arrangement. This comprises for example a cylinder lens which can be moved in the direction of radiation, so as to be able to vary the distance to the mask. The relative movement between the laser beam and the components can either be achieved by moving the laser beam, for example by means of a movable deviation mirror, or by moving the components on an x–y table.

According to a preferred embodiment, a first laser beam aligned perpendicularly to the surface of the mask, is joined by at least one secondary laser beam arranged perpendicularly to the first laser beam, with such joining or admixing taking place via a beam splitter for each secondary laser beam, and with the resulting laser beam being directed onto the mask. To this effect a well-defined beam splitter is used which is highly transparent to one laser beam and highly reflective to the respective secondary laser beam impinging perpendicularly on the first laser beam. Preferably laser beams either of different wavelengths or of the same wavelength but of different polarisation are used. With this method and the respective device, a performance of 200–300 W can presently be achieved.

According to another preferred embodiment, several laser beams are focussed parallel to each other onto the joining area by means of a lens. To this effect the laser sources are arranged in close proximity (spacing approx. 1 mm) to each other. This close design can also limit the angle problem if the focal length of the focal line is sufficiently long. With this arrangement, at present an output of 200 W can be achieved.

This method and device thus make it possible to join plastic plates, molded parts or foils together or to other materials, for example metals, alloys, plastics, ceramics, semiconductor materials, organic or inorganic substances, with such joining occurring at short cycle times and providing high quality; or to surface-join finely-structured workpieces to the desired zone precisely, without damage to the structure, by not only providing adequate energy density in spite of the output of the individual lasers being insufficient, but also by making it possible to vary the line length. In this way high flexibility is achieved.

BRIEF DESCRIPTION OF THE DRAWINGS

Below, the invention is explained in more detail by means of embodiments in conjunction with the accompanying drawings, as follows.

DETAILED DESCRIPTION OF PREFERRED EMBODIMENTS

Figure 1:
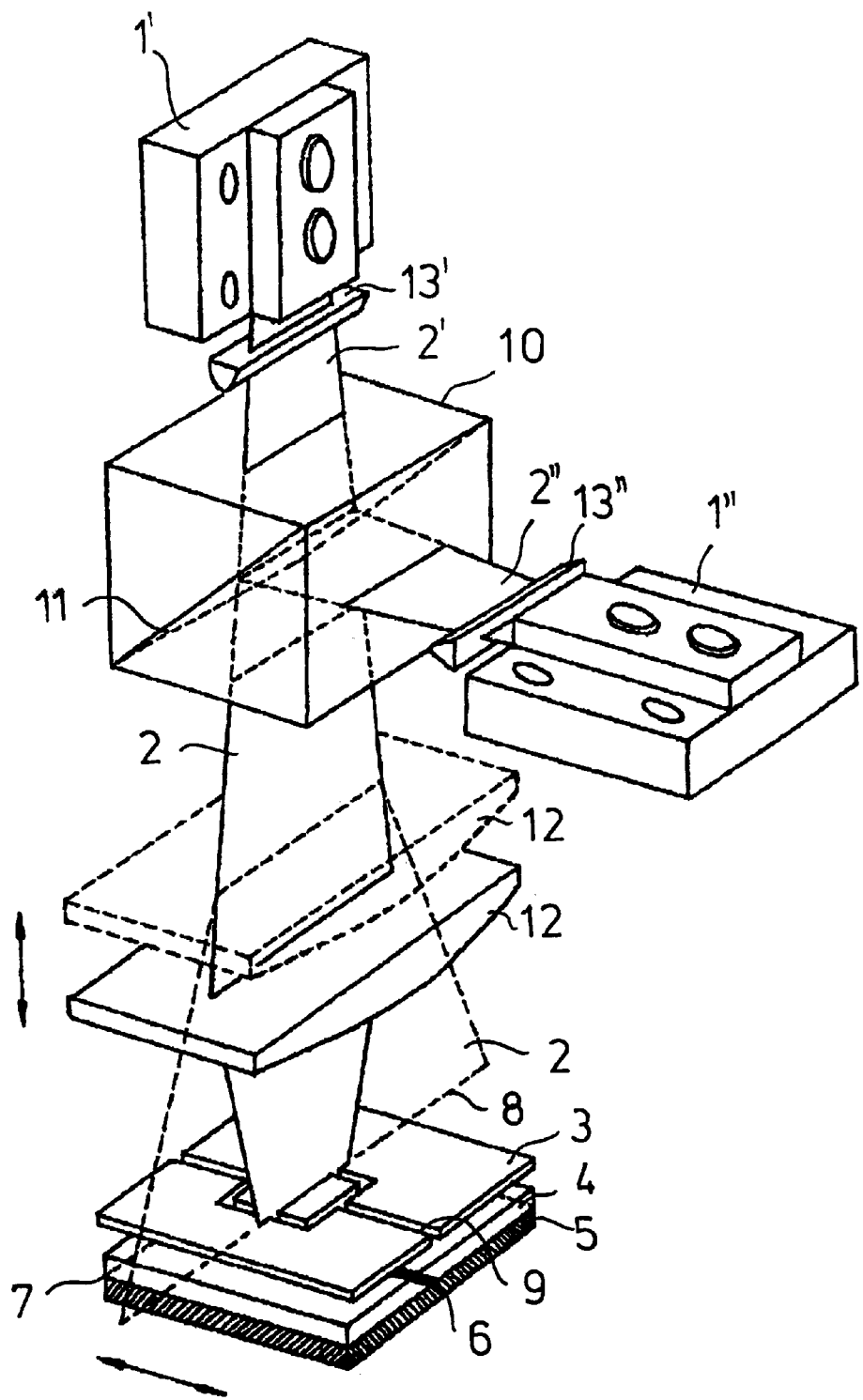
FIG. 1 is a schematic diagram, by way of an example, of an arrangement with two laser sources arranged perpendicularly to each other.
Figure 2:
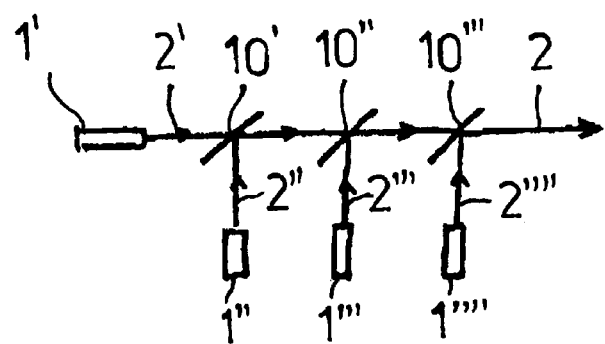
FIG. 2 is a schematic diagram for the arrangement according to FIG. 1 with several parallel laser sources perpendicular to a first laser source.

FIG. 1 shows an example of an arrangement for plane welding of plastic plates 4, 5 which are to be welded only in a certain joining area 6 by means of a laser beam 2 and a mask 3. Accordingly, the arrangement could also be configured for joining or separating components (SMD on carriers etc.). The arrangement comprises a first laser source 1', for example one or several semiconductor lasers (diode lasers), arranged in line, with the laser radiation emitted from said semiconductor lasers being collimated directly by a collimator lens 13'. The laser source 1' is placed such that the laser beam 2, in the manner of a beam curtain, is brought perpendicularly through the apertures 9 of the mask 3 into the joining area 6 of the contact zone 7 between the two plastic plates 4, 5. Before that, the laser beam 2' passes through a beam splitter 10 which is highly transparent to the laser beam 2'. From the laser source 1" arranged perpendicularly in relation to the first laser beam 2', a corresponding laser beam 2", also collimated by means of a collimator lens 13", passes to the beam splitter 10 where it impinges on a surface 11 which is highly reflective to this laser beam 2", thus uniting it with the other laser beam 2' to form laser beam 2. The wavelength of laser beam 2' differs from that of laser beam 2". In another option, the wavelengths of laser beams 2', 2" are identical but the polarisation is different. Insofar as several laser beams are arranged parallel to the laser source 1" so as to increase energy density, said laser beams are to be arranged in conjunction with the beam splitters 10',–10''', as diagrammatically shown in FIG. 2. The conditions for wavelengths or polarisation apply accordingly.

Subsequently the laser beam 2 impinges on a cylinder lens 12 which can be moved in the direction of radiation, so as to generate different line lengths. Line lengths are indicated by dashed lines.

The energetically effective laser line 8 is radiated onto the contact surface 7. As is required for this method, the plastic plate 4 is constructed so as to allow transmission of laser radiation, while the plastic plate 5 is absorbent. The laser beam 2 is continuously moved relative to the mask 3 or the plastic plates 4, 5, so that the plastic plates 4, 5 in the joining area 6 directly below the laser line 8 assume a fused state and subsequently solidify, after cooling.

Figure 3:
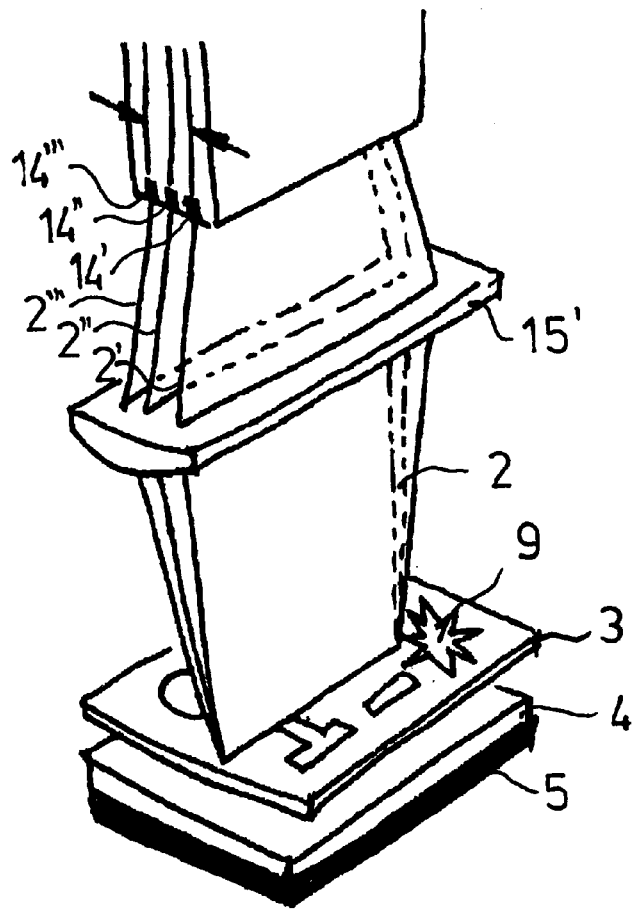
FIG. 3 is a schematic diagram showing another design of the laser source with parallel semiconductor lasers.

FIG. 3 diagrammatically shows an embodiment comprising several laser sources 14'–14''', arranged parallel in respect of each other, so that the laser beams 2'–2''' which are generated, are aligned in close proximity to each other so as to avoid any angle error if at all possible. The spacing of the laser sources is approx. 1 mm, but to avoid angle errors, the number of laser sources used is limited to a maximum thickness of the parallel beams 2'–2''' of approx. 5 mm. The parallel rays 2'–2" are collimated onto the contact surface 7 by means of a convergent lens 15'.

The above-mentioned relative movement required can either take place by moving the plastic plates 4, 5 or the laser beam 2. This can for example be realised with the additional use of a deviation mirror which can be moved into the beam path in front of the cylinder lens or convergent lens.

What is claimed is:

1. A method which comprises: selective heating of at least two materials by means of laser beams, with a mask made of a material impermeable to radiation arranged between a radiation source and the materials; removing regions from said mask, with the laser radiation being admitted through said regions to selected heating regions of the materials arranged below the mask; wherein all heating regions are heated by irradiation, thus leading to joining or separation of the materials, with a relative movement between one or several laser beams and the materials being carried out, and wherein for generating a high energy density, laser beams from at least two diode lasers are brought together into the heating region and with different laser line lengths being subsequently generated by means of zoom optics.

2. A method according to claim 1, wherein a first laser beam is aligned perpendicularly to the surface of the mask, is joined by at least one secondary laser beam arranged perpendicularly to the first laser beam, with such joining or admixing taking place via a beam splitter for each secondary laser beam, and with a resulting laser beam being directed onto the joining area.

3. A method according to claim 2, wherein laser beams either of different wavelengths or of the same wavelength but of different polarisation are used.

4. A method according to claim 1, wherein several laser beams are focussed parallel to each other onto the joining area by means of a lens.

5. A method which comprises: joining various workpieces made of one of (1) plastic and (2) plastic and other materials, with an upper workpiece facing a laser source for a laser beam; wherein said upper workpiece is a material which is transparent to the laser beam, and a second workpiece comprises a material which is absorbent to the laser beam so that the adjoining contact surfaces of the two workpieces melt and connect during subsequent cooling under pressure; arranging a mask made of a laser impermeable material between the laser source and the workpieces to be connected so as to connect the workpieces in a particular joining area of the contact surface; wherein the structures of said mask are larger than the wavelength of the laser beam applied; and wherein the laser source is set to the contact surface in such a way that a curtain-like laser beam is formed and that a line results at the contact surface, and that the laser beam and the mask are moved relative to each other; and wherein for generating high energy density in the joining area, laser beams of at least two diode lasers are brought together, and that subsequently, different laser line lengths are generated by means of zoom optics.

6. A method according to claim 5, wherein a first laser beam is aligned perpendicularly to the surface of the mask, is joined by at least one secondary laser beam arranged perpendicularly to the first laser beam, with such joining or admixing taking place via a beam splitter for each secondary laser beam, and with a resulting laser beam being directed onto the joining area.

7. A method according to claim 6, wherein laser beams either of different wavelengths or of the same wavelength but of different polarisation are used.

8. A method according to claim 5, wherein several laser beams are focussed parallel to each other onto the joining area by means of a lens.

* * * * *